Nov. 30 1943.  E. RICHARD  2,335,445

FLUID DISCHARGING APPARATUS

Filed Jan. 11, 1943

Inventor:
Edgar Richard
By Albert Jourrier
Attorney

Patented Nov. 30, 1943

2,335,445

UNITED STATES PATENT OFFICE 2,335,445

FLUID DISCHARGING APPARATUS

Edgar Richard, Lacolle, Quebec, Canada

Application January 11, 1943, Serial No. 471,985

1 Claim. (Cl. 103—110)

The present invention pertains to a novel fluid discharging apparatus such as a pump, blower or compressor.

The principal object of the invention is to provide a simple device of this character and one that is comparatively inexpensive to build.

The apparatus discharges fluid by the action of relatively rotatable blades. A circular series of blades is preferably carried by the housing and a similar series by a rotor. There may be more than one series on the housing or rotor, all series being concentric and of different radius.

The apparatus may also be built in duplex form, that is, with blades on opposite walls of the housing and on opposite sides of the rotor. In another embodiment, there are no blades on the housing but rather on oppositely rotating rotors.

The invention is fully disclosed by way of example in the following description and in the accompanying drawing in which.

Reference to these views will now be made by use of like characters which are employed to designate corresponding parts throughout.

Figure 1:
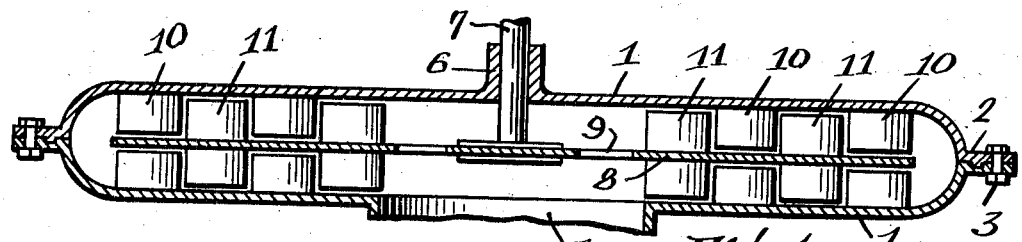
Figure 1 is a cross section of the device.

In Figure 1 is shown a housing consisting of two disked sections 1 having outwardly extending edge flanges 2 bolted together at 3. The sections are circular in contour, and at the center of one of them is an intake opening or inlet 4. A tangential duct 5 extends from the housing as an outlet, as clearly shown in Figure 2.

The section opposite the inlet 4 is formed with a bearing 6 in which is journaled a shaft 7. To this shaft, within the housing, is fixed a disk rotor 8 lying in a plane midway between the flat walls of the sections. The rotor formed with ports 9 near its center as a continuation of the inlet 4.

Figures 2, 5:
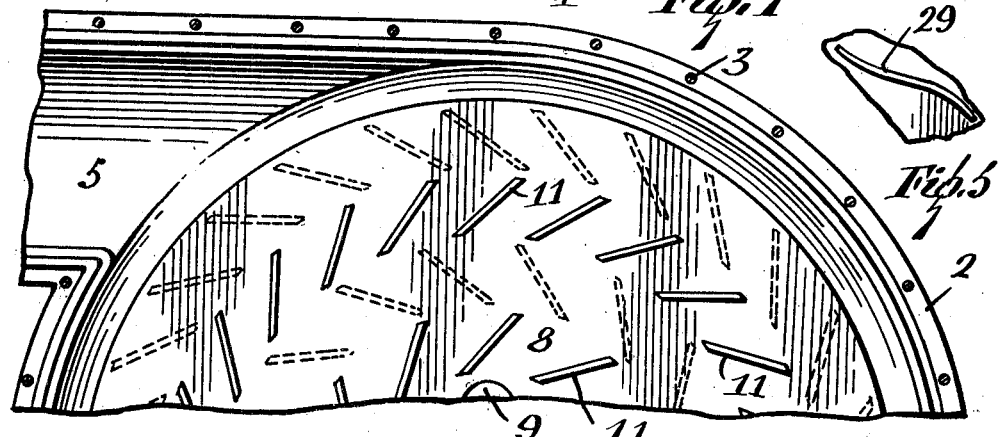
Figure 2 is an elevation thereof with the cover removed.
Figure 5 is a detail of a modified form of blade.

The inner wall of each section 1 carries a series of spaced blades 10. Each blade is approximately at an equal angle to a radius drawn through a like point thereof, for example, its midpoint. Two or more circular series of such blades may be provided, as shown in Figure 2.

The rotor 8 carries similar blades 11 on back sides thereof, directed oppositely to the blades 10 and arranged in circular series alternating with the circular series of blades 10. When the rotor is rapidly driven, fluid will be drawn into the inlet 4, advanced by the action of the rotating blades 11 against the stationary blades 10, and expelled through the duct 5. Thus, the apparatus may function as a pump, blower or compressor.

Figure 3:
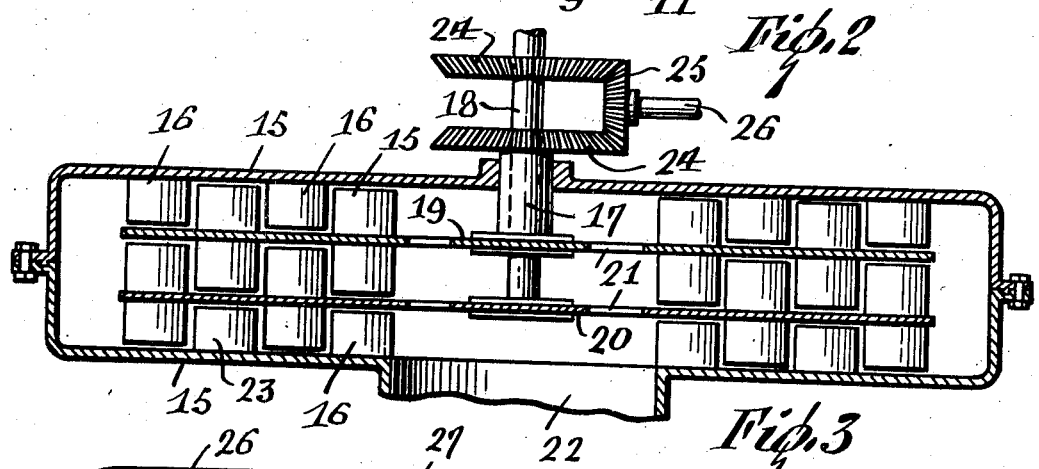
Figures 3 and 4 are cross sections of modifications.

In the modification shown in Figure 3, the sections 15 are deeper than in Figure 1 and carry similar series of inclined blades 16 projecting from the inner walls. A sleeve 17 is journalled in one of the sections, and within the sleeve is a rotatable shaft 18. The sleeve and shaft carry disk rotors 19 and 20 respectively spaced equidistantly from the sections and a like distance from each other. The rotors are parted at 21 to permit continuous flow from an inlet 22. An outlet duct similar to that in Figure 2 is also provided.

The rotors 19 and 20 carry blades 23 on both sides thereof. As in Figure 2, these are directed oppositely to the fixed blades and alternate therewith in circular series.

The sleeve 17 and shaft 18 are provided, outside the housing, with opposed bevel gears 24. In mesh therewith is a pinion 25 on a shaft 26. When the shaft is driven, the rotors are driven in opposite directions and fluid is pumped as previously described.

Figure 4:
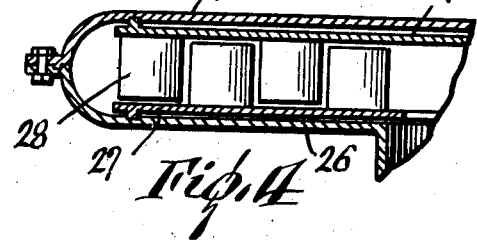

In the modification shown in Figure 4, the housing sections 26 have no blades thereon. Instead, the rotors 27 are disposed close to the sections and each carries circular series of blades 28 extending inwardly. The blades on each rotor obviously alternate with those of the other. The action is as described in connection with Figure 2.

Figure 5 shows a modified shape of blade. Whereas the blades in the preceding figures are flat, the blade 29 of Figure 5 is slightly curved at the ends. This blade is somewhat more difficult to manufacture than the flat blade but has a more efficient pumping action.

In order to reinforce the blades the free ends of said blades could be joined concentrically by sets of rings (not shown).

Although specific embodiments of the invention have been illustrated and described, it will be understood that various alterations in the details of construction may be made without departing from the scope of the invention as indicated by the appended claim.

What I claim as my invention is:

A fluid discharger comprising a housing having an inlet at its lateral center and a tangential outlet, circular series of blades projecting inwardly from opposite walls of said housing on unequal radius, a pair of rotor disks rotatably mounted in said housing, circular series of blades carried by said disk and alternating with the first named series, and means for driving said disks in opposite directions.

EDGAR RICHARD.